United States Patent [19]

Hartung

[11] Patent Number: 4,556,301

[45] Date of Patent: Dec. 3, 1985

[54] ATTACHMENT CASSETTE FOR A ROLL FILM CASSETTE-TYPE PHOTOGRAPHIC CAMERA

[75] Inventor: Hansjürgen Hartung, Wolfenbüttel, Fed. Rep. of Germany

[73] Assignee: Rollei Fototechnic GmbH, Brunswick, Fed. Rep. of Germany

[21] Appl. No.: 576,525

[22] Filed: Feb. 2, 1984

[30] Foreign Application Priority Data

Feb. 3, 1983 [DE] Fed. Rep. of Germany ....... 3303603

[51] Int. Cl.$^4$ ............................................. G03B 23/02
[52] U.S. Cl. ..................................... 352/78 R; 352/76
[58] Field of Search ................. 352/78 R, 72, 129, 76, 352/75

[56] References Cited

U.S. PATENT DOCUMENTS 1,904,097  4/1933  Steiner ............................... 352/78 R
2,036,378  4/1936  Wittel ................................ 352/78 R

FOREIGN PATENT DOCUMENTS 2640517  3/1978  Fed. Rep. of Germany .

Primary Examiner—Monroe H. Hayes
Attorney, Agent, or Firm—Michael J. Striker

[57] ABSTRACT

The attachment cassette for roll film, cassette type camera is provided with sliding control member which simultaneously controls the displacement of film pressure plate relative to a film gate opening, and a shifting movement of a flexible control member for the opening. The flexible control member is in the form of a steel band which is slidably guided in the cassette housing and is provided with transverse score lines to facilitate manipulation.

11 Claims, 4 Drawing Figures

ATTACHMENT CASSETTE FOR A ROLL FILM CASSETTE-TYPE PHOTOGRAPHIC CAMERA

BACKGROUND OF THE INVENTION

The present invention relates in general to a photographic camera having a film gate against which a roll film-type cassette is disconnectably attached. In particular, this invention relates to such a roll film cassette of the type which has a cassette housing formed with a front wall and a rear wall, the front wall being provided with an opening matching the film gate of the camera, and the rear wall being provided with the attachment control means; within the cassette housing there is arranged a film pressure plate coupled to a control mechanism which lifts or lowers the pressure plate relative to the film gate opening.

An attachment cassette of this kind has been described for example in the German publication No. 2,640,517. In this prior art embodiment, the control means include rotatable setting or control knob which during its rotation engages a cam mechanism by means of which the film pressure plate is displaced. In addition, this setting knob activates different resting members. This known embodiment has a rigid cassette closing slider which before the disconnection of the attachment cassette from the camera housing must be manually inserted in the cassette housing.

SUMMARY OF THE INVENTION

A general object of the present invention is to provide an attachment cassette of the aforedescribed kind which avoids the manual control of the closing slider.

In keeping with this object and others which will become apparent hereinafter, one feature of the invention resides, in the attachment film cassette of the aforedescribed kind, in the provision of a flexible closing member which is slidably guided within the cassette housing and rigidly connected with the control element for the film pressure plate, the control element being also slidably guided relative to the cassette housing.

In the preferred embodiment, the film pressure plate is coupled through a control mechanism which in the open position of the closing member when the latter is out of range of the film gate opening, lifts the pressure plate against the film gate opening and alternatively, when the closing member is displaced in its closing position in which it covers the film gate opening, the film pressure plate is lowered away from the film gate opening. The control mechanism includes coupling means which at the beginning of their displacement of the flexible closing member toward its closing position, is in engagement with the control mechanism for the pressure plate so as to lower the same away from the film gate opening and in continuing the movement of the closing member toward its closing position, the mechanism is disengaged from the movement of the closing member and arrests the pressure plate in its lowered position.

Preferably, the control means for the flexible closing member is in the form of a sliding knob which is rigidly connected with the closing member and guided along the rear wall of the cassette housing.

The control mechanism for the film pressure plate includes a sliding support which is arranged for displacement in the direction of movement of the closing member and which is coupled to the sliding control knob by means of an automatically releasing coupling, and which supports via coupling links a lifting or lowering platform which in turn resiliently supports the film pressure plate.

The automatic coupling for the sliding support includes at least one resilient arm projecting from the sliding support and being provided with a pin which engages an approximately L-shaped guiding slot in a stationary plate. The pin in turn engages a retaining shoulder of a slot formed in the sliding control knob and only when the pin enters the arresting transverse part of the L-shaped guiding slot it becomes disengaged from the retaining shoulder in the other slot so that the support plate is arrested in the transverse part of the guiding slot and the control knob is free to move in the closing direction.

The automatic coupling of the pin in the transverse part of the L-shaped guiding slot is achieved by the resilient bias of the arm of the sliding support.

With advantage there are provided at two opposite longitudinal sides of the sliding support two resilient arms each supporting a coupling pin, whereby the coupling pins engage mirror-symmetrically arranged L-shaped guiding slots in the stationary plate.

In this manner, by shifting a single control element the film pressure plate is displaced away from the film gate opening in the cassette housing while the flexible closing member is slidably displaced in its closing position over the film gate opening. Preferably, the sliding control element is arranged at the rear wall of the attachment cassette housing, and the flexible closing member is in the form of a sheet which is guided past the film roll in the cassette by semicircular guides before being advanced in the plane of the film gate opening. In order to achieve a high degree of operational comfort, it is desirable to keep the force necessary for the displacement of the slidable closing member and of the pressure plate as low as possible.

According to another feature of this invention, the closing member is made of a flexible steel band formed with score lines extending transversely to the direction of its displacement, the score lines being in the form of rectilinear grooves successively etched in the steel band.

In the preferred embodiment, the thickness of the steel band is about 0.1 mm, the depth of the etched grooves is about 0.05 mm, the breadth of the grooves is about 0.2 mm, and the division of the grooves is about 1 mm.

The resulting slidable closing member of the cassette is sufficiently flexible for being displaced into its closing or opening position with minimum exertion of displacing forces. On the other hand, the closing member has a sufficiently high stability and the production of the closing member is relatively simple.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
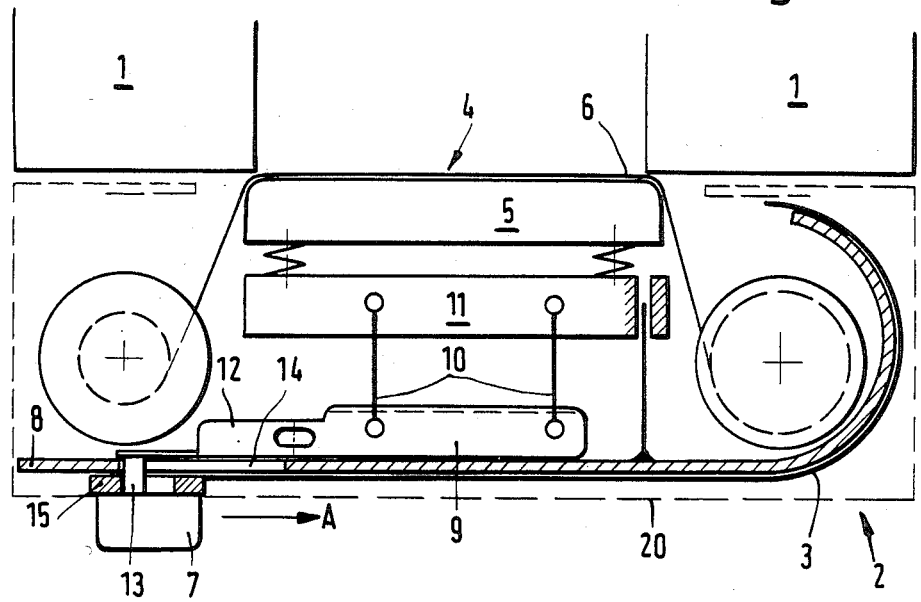
FIG. 1 is a sectional top view of an attachment film cassette of this invention, shown in a simplified form.
Figure 2:
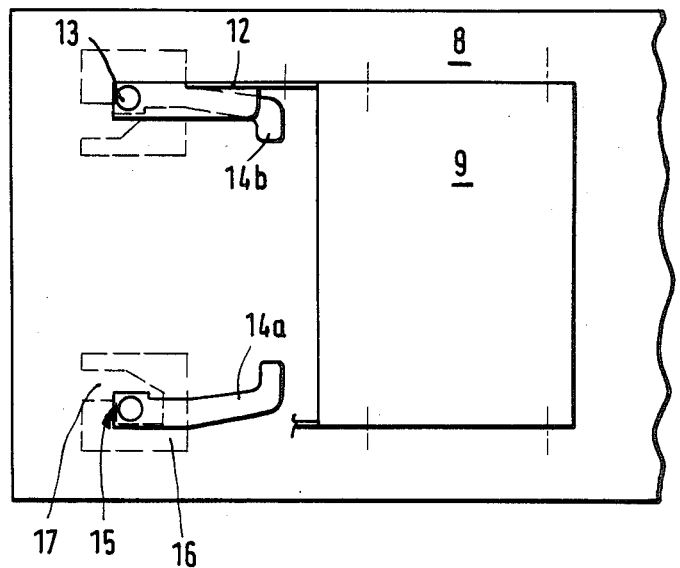
FIG. 2 is an elevational view of a detail of the coupling mechanism in the film cassette of FIG. 1.

FIG. 1 illustrates a rear end of a camera housing 1 with a film gate at its central part. An attachment film cassette 2 indicated by dashed lines is disconnectably attached to the rear wall of the camera housing 1. The connecting and locking means between the cassette and the camera housing are of conventional design which is not part of this invention and, therefore, they are not illustrated. The front wall of the cassette 2 is provided with a film gate opening 4 which as it will be described in greater detail below, is selectively covered by a slidable closing member 3 and cooperates with a film pressure plate 5 on the upper surface of which a film strip 6 is fed.

The rear wall of the cassette 2 corresponding to the lower dashed line in FIG. 1 is provided with shiftable control knob 7 which in FIG. 1 is illustrated in its starting position and is movable along the entire length of the rear wall in the direction indicated by arrow A. The control knob 7 is rigidly connected to one end of the flexible closing member 3 and according to one feature of this invention, is releasably coupled to a support 9 which is slidably arranged on a fixed plate 8 for a limited movement in the direction of arrow A. The support 9 is provided with links 10 which are hinged to a platform 11 provided with a guiding opening engaging an upright rod secured to the fixed plate 8. The platform 11 resiliently supports the film pressure plate 5.

The sides of the support 9 extending parallel to the direciton of its movement are extended in the form of resilient arms 12 which are elastically biased toward each other and each being provided at its free end with a coupling pin 13 directed through a substantially L-shaped guiding slot 14 in the fixed plate 8. The longer part 14a of the guiding slot is directed substantially parallel to the direction of movement A whereas the transverse shorter part 14b of the guiding slot is directed substantially at right angles to the direction A. As long as the pin 13 is guided in the longer slot part 14a it engages a retaining shoulder 15 of another guiding slot 17 formed in a sliding show 16 which is rigidly connected to the bottom of the control knob 7. The retaining shoulder of each slot 17 communicates with a sloping guide part which opens to the rear side of the sliding shoe 16. When the coupling pin 13 is forced by the biased resilient arm 12 to enter the transverse slot 14b in the plate 8, then it is automatically uncoupled from the retaining shoulder of the slot 17 and exits through the open slot 17 from the sliding shoe 16 of knob 7.

When the attachment cassette 2 is to be removed from the camera housing 1, then the film gate opening 4 must be first closed. For this purpose, the slidable control knob 7 is moved in the direction of arrow A from the starting position illustrated in FIG. 1 to an end position at the right side of the cassette. During this movement, the flexible cassette closing member 3 is simultaneously displaced in the direction of arrow A and so is sliding support 9 which at the beginning of movement of the control knob 7 is coupled by the pin 13 to the carrier 15. As a result, at the initial phase of movement of the support 9 in direction A the hinge links 10 lower the platform 11 and withdraw the pressure plate 5 away from the film gate opening 4. During the further shift of the control knob 7 the two coupling pins 13 enter by the action of resilient arms 12 the transverse shoulders of the L-shaped guiding slot 14 and disengage the retaining shoulder of the other carrier slot 17 in the sliding shoe 16 of the control knob. As a result, the coupling pins 13 are decoupled from the sliding control knob 7 and arrest the platform 11 with the film pressure plate 5 in their lowered position. The decoupled control knob 7 is moved further in the direction of arrow A whereby the flexible closing member 3 is guided to its closing position opposite the film gate opening 4.

Figure 3:
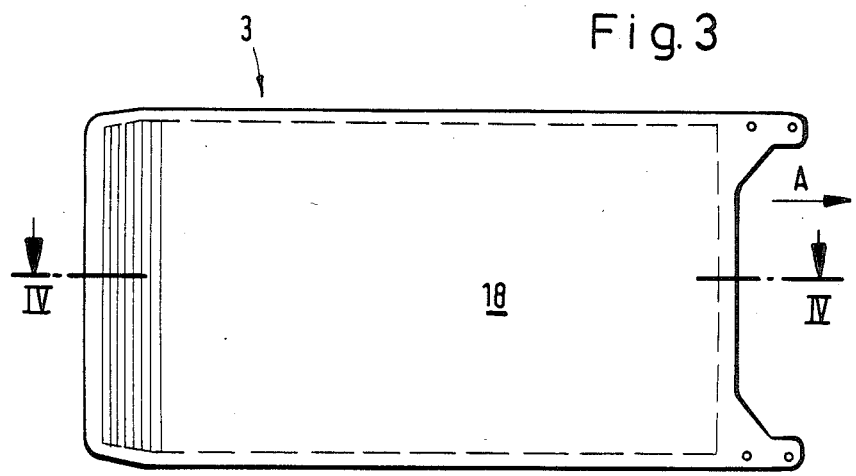
FIG. 3 shows an elevation view of the flexible closing member in the cassette of FIG. 1.
Figure 4:
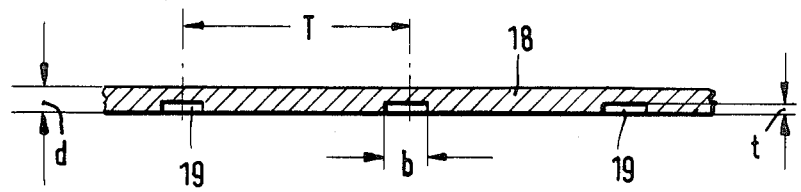
FIG. 4 shows a sectional top view of part of the closing member of FIG. 3, taken along the line IV—IV.

FIGS. 3 and 4 show a preferred embodiment of the cassette closing member 3. In this embodiment, it consists of a steel band 18 which is formed with a succession of score lines directed transversely to the direction of movement A of the band. These score lines are in the form of a series of parallel grooves 19 formed in the steel band by etching (FIG. 4). Reference character d indicates the thickness of the steel band, t the depths of the grooves, b the breadth of the grooves and T the spacing between subsequent grooves.

The fixed plate 8 is shaped to serve as a guide for the flexible closing member 3 and is rigidly connected to the cassette housing 20 indicated by dashed lines in FIG. 1.

It will be understood that each of the elements described above, or two or more together, may also find a useful application in other types of constructions differing from the types described above.

While the invention has been illustrated and described as embodied in a specific example of the attachment cassette, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An attachment cassette for use in a roll film cassette type camera having a camera housing provided with a film gate, comprising a cassette housing attachable to the camera housing and having a front wall formed with an opening in alignment with said film gate, a rear wall, control means attached for sliding movement along said rear wall, a flexible elongated closing member secured to said control means and being arranged for sliding movement in said cassette housing between a starting position in which it is out of the range of said opening, and an end position in which it closes said opening, a film pressure plate arranged in said cassette housing opposite said opening, and a pressure plate actuating means coupled to said control means for adjusting the position of said pressure plate relative to said opening in response to the position of said control means.

2. An attachment film cassette as defined in claim 1, wherein said actuating means includes a coupling device arranged between said pressure plate and said control means for engaging said actuating means during an initial path of movement of said control means from said starting to said end position before the closing member enters the range of said opening and displacing said actuating means together with said pressure plate away from said opening so that the flexible closing member during the further displacement of said control means toward said end position is free to cover said opening.

3. An attachment film cassette as defined in claim 2, wherein said control means is a sliding knob which is rigidly connected to said closing member.

4. An attachment film cassette as defined in claim 3, wherein said actuating means includes a sliding support mounted in the cassette housing for sliding movement parallel to the path of movement of said sliding knob, said coupling device being connected to said sliding support and releasably coupled to said sliding knob, said actuating means further comprising a platform carrying said pressure plate, said platform being linked to said sliding support and being provided with guiding means to move toward or away from said opening in response to the displacement of said support.

5. An attachment film cassette as defined in claim 4, wherein said coupling device includes a coupling pin mounted on said sliding support and being movable in transverse direction relative to the latter, a stationary guiding slot provided in said cassette housing for engaging said coupling pin, said guiding slot having a substantially L-shaped configuration defining an elongated slot part directed substantially in the direction of movement of said sliding knob and a transverse slot portion, another guiding slot formed in said sliding knob and defining a retaining part which is in alignment with the elongated slot portion of said stationary guiding slot, and an open part laterally offset from said retaining part in such a manner that when the coupling pin enters the transverse slot portion of said stationary guiding slot, the coupling pin is disengaged from the retaining part of said other guiding slot in said sliding knob and exits through the open part of the other slot.

6. An attachment film cassette as defined in claim 5, wherein said sliding support is provided with at least one resilient arm extending in the direction of its movement and supporting said coupling pin, said resilient arm being biased in the transverse direction to displace said coupling pin into said transverse part of said stationary guiding slot.

7. An attachment film cassette as defined in claim 1, wherein said flexible closing member is in the form of a steel band provided with a plurality of score lines extending at right angles to the direction of its movement.

8. An attachment film cassette as defined in claim 7, wherein said score lines are etched grooves.

9. An attachment film cassette as defined in claim 8, wherein the steel band has a thickness of about 0.1 mm.

10. An attachment film cassette as defined in claim 8, wherein the depths of said grooves is about 0.05 mm and the breadth of said grooves is about 0.2 mm.

11. An attachment film cassette as defined in claim 10, wherein the spacing between the grooves is about 1 mm.

* * * * *